E. FRANKLAND.
FRONT WHEEL BRAKE FOR MOTOR VEHICLES.
APPLICATION FILED JUNE 16, 1921.
1,433,540.
Patented Oct. 31, 1922.
2 SHEETS—SHEET 1.
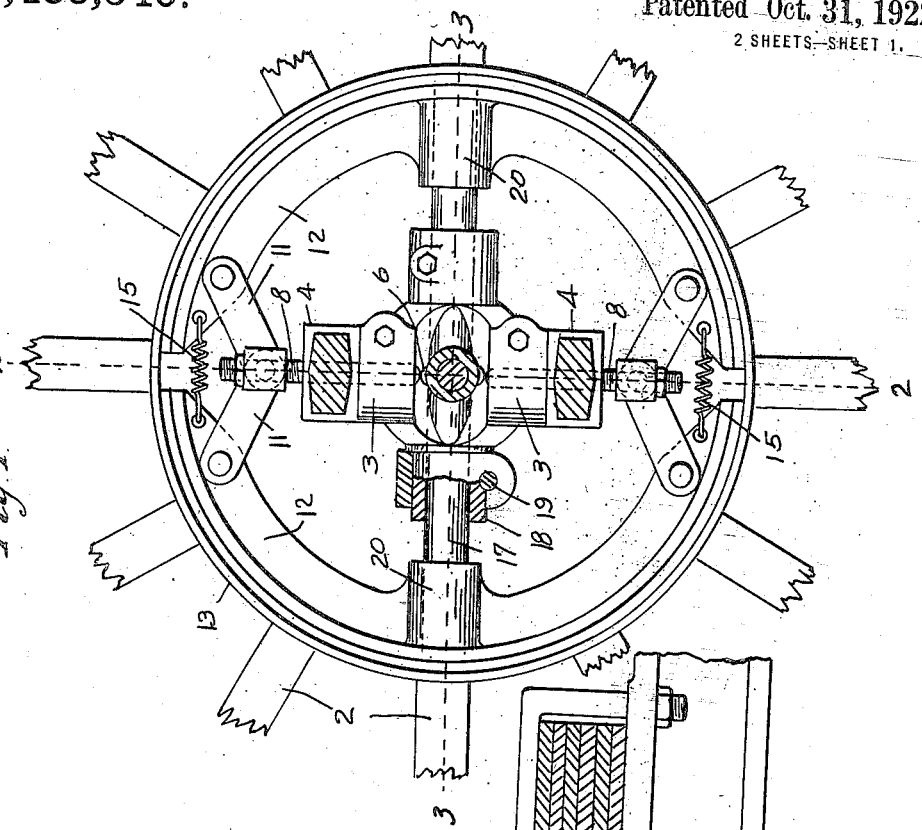
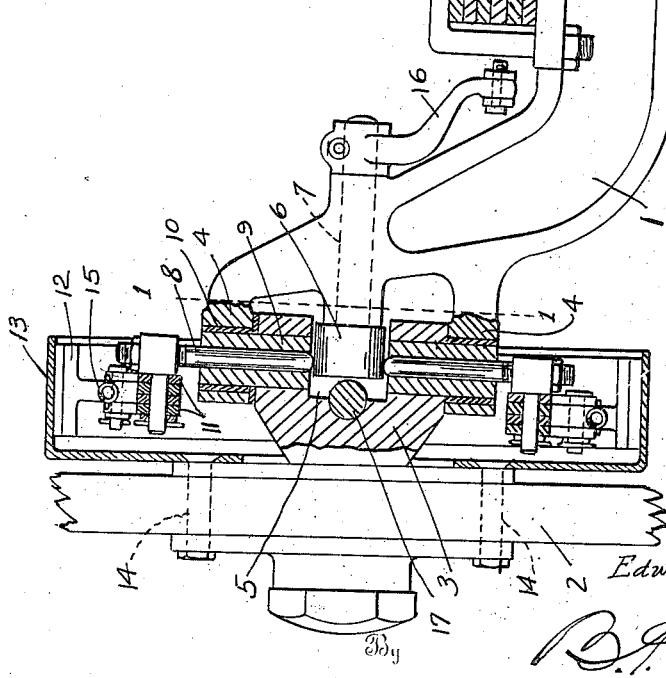
Inventor
Edwin Frankland.
Attorney

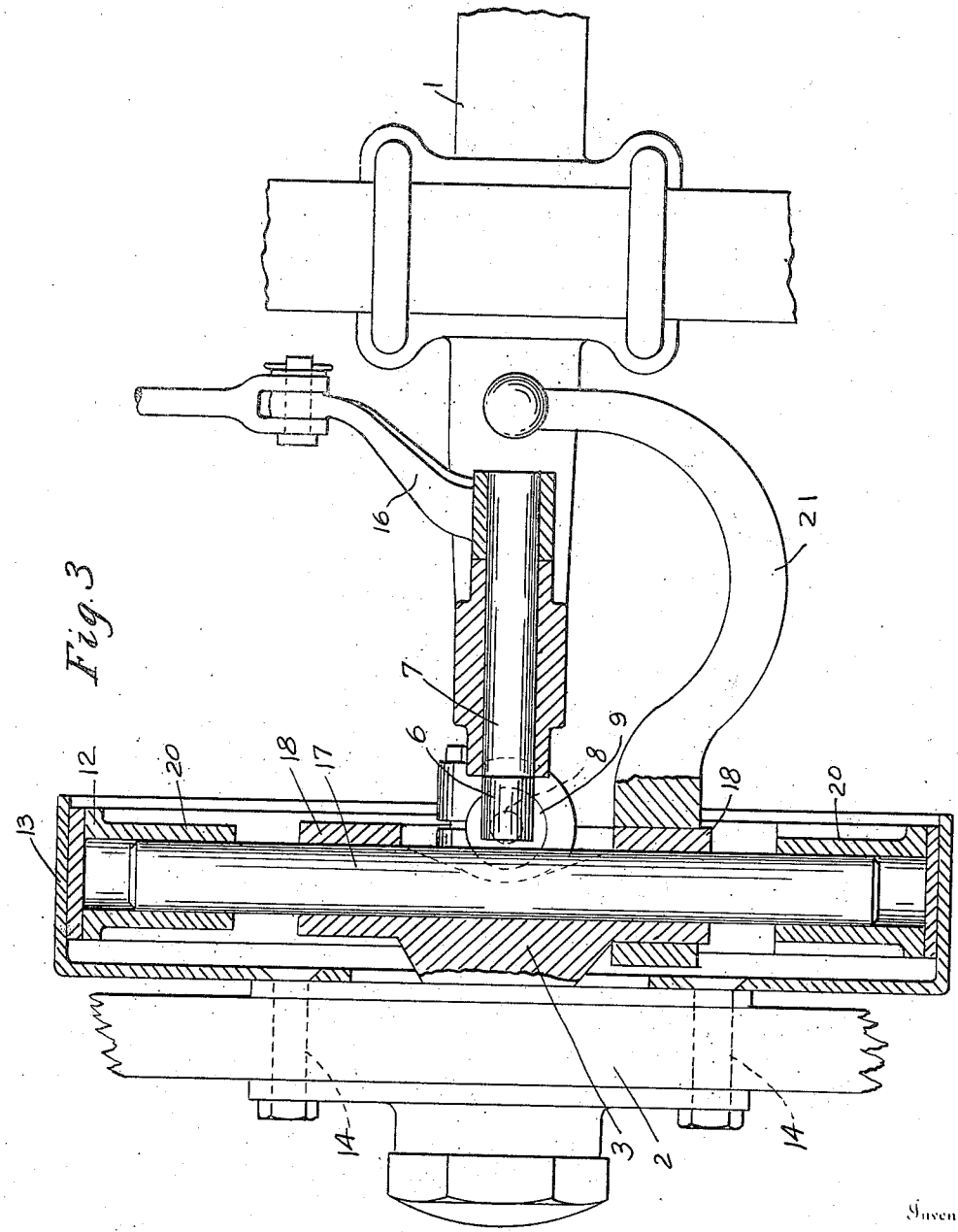

Patented Oct. 31, 1922.

1,433,540

UNITED STATES PATENT OFFICE.

EDWIN FRANKLAND, OF PONTIAC, MICHIGAN, ASSIGNOR OF ONE-HALF TO AMOS E. CARLE, OF DETROIT, MICHIGAN.

FRONT-WHEEL BRAKE FOR MOTOR VEHICLES.

Application filed June 16, 1921. Serial No. 478,193.

*To all whom it may concern:*

Be it known that I, EDWIN FRANKLAND, a subject of the King of Great Britain, residing at Pontiac, in the county of Oakland and State of Michigan, have invented a new and useful Front-Wheel Brake for Motor Vehicles, of which the following is a specification.

This invention relates to front wheel brakes for vehicles and it is the object of the invention to provide a brake for the front wheels of a motor vehicle that will not interfere with the usual functioning of said wheels for steering purposes.

In attaining this object the invention contemplates the provision, in association with the usual steering knuckles of the front wheels of a vehicle, a pair of plungers vertically slidable within the pivot member of the knuckle and arranged to control the application of a brake band to a drum upon the wheel, said plungers being actuable by a cam disposed between the same upon a rock shaft transverse to said plungers and operable from the driver's seat of the vehicle.

A preferred embodiment of the invention is hereinafter described and illustrated in the accompanying drawings, wherein, Fig. 1 is a view interiorly showing the center portion of a front wheel equipped with the improved steering mechanism, said view being in part a section on line 1—1 of Fig. 2.

Fig. 2 is a vertical sectional view of the same taken on line 2—2 of Fig. 1.

Fig. 3 is a horizontal sectional view taken on line 3—3 of Fig. 1.

In these views the reference character 1 designates the front axle of a vehicle and 2 one of the wheels of said axle. The mounting of said wheel upon its axle is substantially in accordance with common practice, the wheel spindle having an integral pivot head 3 engaging between vertically alined forks 4 of the axle. The invention includes in the head 3 a central opening 5 to accommodate a cam 6 formed upon a rock-shaft 7 journaled parallel to the axle 1 in the forked end thereof. Said cam lies between and operatively engages two vertically alined plungers 8 respectively slidable within tubular pivot members 9 rigidly mounted in the head 3 and which project respectively upwardly and downwardly therefrom to pivotally engage the axle forks 4. Bushings 10 are carried by said forks 4, and embrace said pivot members to take the wear resulting from the turning movement of the latter therein. The remote ends of the two plungers 8 respectively engage pairs of toggle links 11 which extend from said plungers in obtusely divergent relation to the ends of complementary semi-circular brake shoes 12 interiorly co-acting with a brake drum 13 secured by bolts 14 to the hub of the wheel 2. The adjacent ends of said brake shoes are connected by coiled springs 15, tending to retract and disengage said shoes from the brake drum, said springs being overcome when the plungers 8 are thrust apart by the cam 6, increasing the convergence of the toggle links 11. The use of said toggle mechanism affords a powerful leverage in applying braking pressure, this leverage being increased also by providing for actuation of the cam 6 of the rock-shaft 7 by a crank arm 16 having a length considerably greater than the maximum radius of said cam. The brake shoes 12 are mounted to slide toward and from each other upon a rod 17 horizontally carried by the pivot head 3 in diametrical relation to the drum 13, the head 3 being formed with split sleeves 18 to embrace said rod, which sleeves are engaged by clamping bolts 19 and the brake shoes being formed equi-distant from their ends with radial slide bearings 20 for the reception respectively of the extremities of said rod. With one of said sleeves 18 there is engaged a crank arm 21 adapted for connection with the drag link of the usual steering mechanism, not shown.

From the preceding description it will be evident that when, through rocking of the arm 16, the cam 6 assumes the vertical position shown in the drawings, the plungers 8 will be shifted apart a maximum distance, subjecting the pairs of toggle links 11 to a maximum divergence and engaging the brake shoes 12 firmly with the drum 13, in opposition to the springs 15. Said springs will relieve the drum 13 from engagement by the brake shoes to the extent that the plungers 8 are permitted to approach each other through rotation of the cam.

It is to be observed that the described brake mechanism is one that is associated in such manner with the steering mechanism of the wheel that the two said mechanisms are mutually non-interfering, the brake being applicable to the wheel in any steering position thereof, and the control of the wheel by its steering mechanism being not effected by the brake, whether or not the same be engaged with the drum.

The described invention in providing for the application of a brake to the front wheels, additional to the usual provision for braking the rear or driving wheels of a vehicle, increases the safeguard against skidding, and distributes the frictional resistance to travel of the vehicle to four wheels rather than two so as to decrease the resulting strain and wear upon the wheels, and reduces also the strain imposed upon the vehicle as a whole.

What I claim is:

1. In a device of the character described, the combination with a vehicle wheel and forked axle, of a spindle mounting the wheel, a head carried by said spindle engaging between the forks of said axle, a vertical tubular pivot member connecting said head to the forks of the axle, a brake drum carried by the wheel, a brake shoe interiorly engageable with said drum, a rod mounted diametrically of said drum in the head of said spindle and slidably carrying said brake shoe, and an actuating mechanism for said shoe including an element extending within said tubular pivot member.

2. In a device of the character described, the combination with a vehicle wheel and a forked axle, of a spindle forming a mounting for the wheel, a head carried by said spindle engaging between the forks of the axle, vertical tubular pivot members carried by said head and journaled in the respective forks of the axle, plungers mounted in said pivot members, a brake drum carried by the wheel, a rod carried by said head transverse to said pivot members, a pair of complementary brake shoes interiorly engageable with said brake drum and slidable to or from each other upon said rod, toggle links connecting the remote ends of said plungers to said brake shoes, a cam engaging the adjacent ends of the plungers within said opening of the head, and a rock-shaft carrying said cam and journaled in the axle.

In testimony whereof I sign this specification.

EDWIN FRANKLAND.